United States Patent Office 2,772,775
Patented Dec. 4, 1956

2,772,775
TREATMENT OF SYLVINITE ORE

George E. Atwood, Carlsbad, N. Mex., assignor to International Minerals & Chemical Corporation, a corporation of New York No Drawing. Application March 2, 1953,
Serial No. 339,917

13 Claims. (Cl. 209—11)

This application is continuation-in-part of copending application Serial No. 188,275, filed October 3, 1950 and now abandoned.

This invention relates to the treatment of sylvinite-containing ores, and more particularly to the heat treatment of sylvanite-containing ores.

Heretofore, sylvanite has been mechanically crushed or ground in order to liberate the mineral constituents from one another and to obtain a suitable particle size at which the physical separation of sylvanite particles may be effected.

Sylvinite ore is a mechanical mixture containing sylvite (KCl) and halite (NaCl). In order to recover the potash values therefrom, sylvite must be unlocked from the halite by comminution of the ore. Potash values are then recovered from the comminuted product by any well-known process for the separation of potassium chloride from sodium chloride, such as by heavy media classification, froth flotation, or by tabling.

The investigation of new methods of comminution of sylvinite ore is the result of disadvantages inherent in the mechanical crushing and grinding methods now being used. Much effort has been expended in attempts to discover a method of comminution of the ore which unlocks potassium-containing minerals without the production of an appreciable quantity of fines from which the sylvite values are recovered only with great difficulty and at low efficiency. In addition, often it is desirable to recover the muriate of potash in a coarse granular form in that the coarse granular form in many cases is preferred for use in agriculture and industry.

Another difficulty in the beneficiation of certain sylvinite ores which contain large amounts of clay-like material is the formation of slimes. The presence of these clay-like slimes in potash ores, such as those found in the New Mexico area, are very troublesome when the ore is beneficiated. For example, when the ore is subjected to flotation the slimes adsorb the flotation reagent and prevent floating of the potassium-containing concentrate. In the past there has been no commercially feasible method of beneficiating the potash ores which contain excessively high amounts of insoluble slime forming material, because of the large quantities of reagents that would be required.

It is an object of the instant invention to provide a method of beneficiating sylvinite ore involving heat treatment of the ore.

It is a further object of the instant invention to provide a method of comminuting sylvinite ore to liberate the constituent minerals by heat treatment.

It is a further object of the instant invention to provide a method of comminuting sylvinite ore to liberate the constituent minerals by heat treatment, and without the production of significant amounts of fines.

It is a further object of the instant invention to provide a method for the economical production of coarse granular sylvite of 60% or more potassium oxide grade.

It is a further object of the instant invention to provide a method of inactivating insoluble slime forming material which is present in sylvinite containing ores.

These and other objects of the instant invention will become apparent upon a fuller understanding of the invention as hereinafter set forth.

It has been discovered that when ore containing sylvinite is heated at a temperature above about 180° C. but below its fusion temperature, comminution of the ore occurs thus unlocking the potassium-containing minerals. The potassium-containing mineral constituents are then recovered from the heat-treated ore by well-known methods, such as heavy media classification or tabling.

Decrepitation of sylvinite ore begins at about 180° C. and increases to a maximum when the temperature is in the range of between about 300° C. and about 450° C. No further comminution of the mineral occurs at temperatures above about 500° C.

Thermal comminution products are characterized by the virtual absence of particles smaller than 35 mesh.

Heating of the ore in accordance with the instant invention results in the comminution of the larger sylvinite particles in the feed, and also in alteration of insoluble particles which form slimes. In practice, thermal treatment reduces or eliminates the slime problem in that it alters the slimes from clay-like colloidal-type material to hard, brittle, nondispersible material. This is particularly significant in the treatment of ores which contain substantial amounts of insoluble clay-like material which form slimes. It has been discovered that these sylvinite ores which are comparatively high in insoluble material can be heat treated, with or without further comminution, and subjected to froth flotation in order to recover the potassium values therefrom. Heretofore, to subject these ores containing large amounts of slimes to flotation was not feasible, because standard methods of slime removal were not effective, and the cost of benefication was prohibitive. In one embodiment of the instant invention, this type ore is heated at a temperature between about 180° C. and about 600° C., preferably between about 400° C. and about 550° C. in order to inactivate the slimes. The heat treated ore is then ground for froth flotation, reagentized, conditioned, and subjected to froth flotation to recover the potassium values.

Sylvinite ores or ores containing sylvinite and other minerals such as langbeinite, for example, such potash ores as the sylvinite-langbeinite mixed ores found in the Carlsbad, New Mexico, area, are subjected to heat treatment in accordance with the instant process. The ore as received from the mine is heated to between about 180° C. and about 600° C., i. e., to just below the fusion temperature. Ores which are not excessively high in slime forming material are preferably heated at between about 300° C. and about 450° C. The temperature at which audible cracking or comminution occurs increases slightly upon heating particles of increasing size; thus, the retention time in the kiln depends upon the particle size being treated and upon the temperature of the kiln.

In treating ores containing a comparatively high content of slime forming material, the ore is preferably heated at a temperature between about 400° C. and about 550° C. The retention time for inactivation of the slime material in the ore is generally between about 10 minutes and about 20 minutes, but varies depending upon the slime content of the ore. The inactivated material need not be separated from the ore prior to further beneficiation such as froth flotation.

In the practice of the instant novel process, sylvinite ore particles can be heated in a rotary kiln maintained at a temperature between about 180° C. and about 550° C. The burner can be fired countercurrent to the movement of the ore in the kiln. The rate of rotation of the kiln is adjustable and may be set to control the retention time of the ore. Although a rotary kiln is preferred, an electric furnace, or any other standard type of heating equipment may be used in the practice of the instant novel process.

The products of the heat treatment are screened, and the potassium-containing minerals recovered from any desired screened fraction according to known methods for that fraction.

If desired, the product of the heat treatment can be further comminuted and the $K_2O$ values recovered by froth flotation.

In order to show the effect of heat upon various size fractions of feed, several sized fractions were heated at a temperature between about 320° C. and about 350° C. Table I shows the screen analysis of the kiln products when sylvinite ore particles having a diameter smaller than about 2½ inches and larger than about 1½ inches were heated at between about 320° C. and about 350° C. Comminution is indicated by audible popping. The —3 mesh screens used were Tyler mesh series. The 3 mesh screens had .263 inch openings, the 2½ mesh had .271 inch openings, and the 2 mesh had .525 inch openings.

TABLE I

Screen analysis of a thermal product

| Mesh | Percent By Wt. of the Feed |
|---|---|
| +2 | 20.28 |
| —2+2½ | 5.83 |
| —2½+4 | 7.72 |
| —3+4 | 18.77 |
| —4+6 | 17.65 |
| —6+8 | 13.31 |
| —8+14 | 11.16 |
| —14+20 | 3.17 |
| —20+35 | 1.40 |
| —35 | 0.71 |

The sylvite can be recovered from the —2+20 mesh fractions by heavy media classification, tabling, or other known methods.

Table II shows the screen analysis of the thermal comminution product of sylvinite ore feed which contained particles of size between about 4 mesh and about ½ inch in diameter.

TABLE II

Screen analysis of a thermal product

| Mesh | Percent By Wt. of the Feed |
|---|---|
| —2+2½ | 9.97 |
| —2½+3 | 19.69 |
| —3+4 | 39.86 |
| —4+6 | 15.51 |
| —6+8 | 8.48 |
| —8+14 | 6.46 |
| —14+20 | 2.11 |
| —20+35 | 0.64 |
| —35 | 0.28 |

Table III shows the percent sylvite potassium in the thermal comminution product (heated to about 320° C.) when the sylvinite ore feed contained particles of size between about 4 mesh and about 7 inches in diameter, and the heat-treated product was screened into closely sized fractions, each of which was subjected to heavy media classification to give a sylvite fraction, a sylvite middlings fraction, a halite middlings fraction, a halite fraction and a langbeinite fraction. The sylvinite ore used contained langbeinite and analyzed about 14.15% potassium, about 5.79% sulfate, and about 1.38% water-insoluble material. The 60% $K_2O$ muriate of potash product contains 49.81% potassium.

TABLE III

Percent sylvite potassium in thermal product

| Mesh Size | Sylvite Fraction | Sylvite Middlings Fraction | Halite Middlings Fraction | Halite Fraction | Langbeinite Fraction | Total |
|---|---|---|---|---|---|---|
| —2+2½ | 43.42 | 31.78 | 17.18 | 5.04 | 3.52 | 13.30 |
| —2½+3 | 43.38 | 32.36 | 13.77 | 2.93 | 3.29 | 14.42 |
| —3+4 | 50.36 | 29.99 | 11.10 | 1.66 | 1.96 | 12.06 |
| —4+6 | 50.38 | 27.18 | 11.45 | 1.12 | 1.03 | 10.35 |
| —6+8 | 50.29 | 37.49 | 9.74 | 0.82 | 0.93 | 9.59 |
| —8+14 | 50.13 | 38.80 | 8.01 | 0.65 | 0.73 | 8.83 |
| —14+20 | 50.27 | 37.51 | 9.06 | 0.62 | 0.73 | 8.13 |

Table IV shows the recovery and grade of sylvite potassium resulting from the separation of the thermally comminuted product into fractions as in Table III and separating sylvite from the middlings fractions.

TABLE IV

Recovery and grade of potassium from thermal comminution product

| Mesh Size | Concentrate (Sylvite) | | Percent Middlings | | Tailings (Halite and Langbeinite) | |
|---|---|---|---|---|---|---|
| | Percent Sylvite Potassium | Percent of Total Potassium in Feed | Percent Sylvite Potassium | Percent of Total Potassium in Feed | Percent Sylvite Potassium | Percent of Total Potassium in Feed |
| —14+20 | 50.3 | 81.9 | 18.0 | 11.5 | .66 | 6.6 |
| —8+20 | 50.2 | 79.9 | 17.0 | 14.0 | .67 | 6.1 |
| —6+20 | 50.2 | 78.8 | 17.6 | 14.8 | .75 | 6.4 |
| —4+20 | 50.3 | 78.4 | 16.2 | 13.9 | .88 | 7.7 |
| —3+20 | 50.4 | 76.3 | 16.5 | 15.4 | 1.17 | 8.3 |
| —2½+20 | 50.0 | 74.0 | 16.9 | 16.7 | 1.43 | 9.3 |
| —2+20 | 49.5 | 71.1 | 17.5 | 18.3 | 1.67 | 10.6 |

Table V shows the ultimate recoveries realized when the middling fractions are mechanically comminuted and treated as above to yield concentrates and tails equivalent to those noted above.

TABLE V

Recovery of potassium

| Mesh Size | Percent Potassium Recovered |
|---|---|
| —14+20 | 92.5 |
| —8+20 | 92.9 |
| —6+20 | 92.5 |
| —4+20 | 91.1 |
| —3+20 | 90.2 |
| —2½+20 | 88.8 |
| —2+20 | 87.0 |

When the middling fraction of comminuted particles of between about 3 and about 20 mesh size are subjected to heavy media classification to recover sylvite, over 90% of the potash values are recovered as 60% $K_2O$ muriate of potash.

The heat treated comminuted particles having a size between about —4 and about +20 mesh may be subjected to granular flotation as described and claimed in copending U. S. patent application, Serial No. 101,482, filed June 25, 1949, and now abandoned, to recover 90% of the potash values as a 60% $K_2O$ muriate of potash product.

Alternatively, the heat treated particles may be further ground to about 100% —20 mesh size and subjected to froth flotation to recover the potassium values.

For example, heat treated sylvinite containing ore is suspended in sufficient aqueous solution saturated with respect to the soluble constituents of the ore to obtain a pulp having a solids density of between about 40% and about 70%. A solution of slime inhibitor or depressant, such as a starch solution of the type described by Tartaron, et al. in U. S. 2,288,497 is added to the pulp. A cationic reagent which has an affinity for the constituent of the ore which it is desired to collect as the concentrate is then added. For example, sylvite particles are floated by cationic reagents of the type described in U. S. 2,088,325, issued to Kirby, and in U. S. 2,132,902, issued to Lenher. Straight chain aliphatic amines and the water soluble acid addition salts thereof containing at least one alkyl group having 7–18 carbon atoms are used as the flotation reagent for collecting sylvite. When ores containing sylvinite and lagbeinite are employed as raw material, fractions of langbeinite and of sylvinite can be recovered by froth flotation by use of collector reagents, as described in U. S. 2,297,664, issued to Tartaron et al. In one embodiment, langbeinite is floated with a collector known as Igepon and comprising alkyl sulfonates of long chain fatty acid derivatives. The tailings, which contain sylvite, are subjected to flotation in the presence of a sylvite collector and a sylvite concentrate is obtained.

The ore pulp is conditioned generally with reagent in an amount between about 0.1 and about 2 lbs. per ton of feed, depending upon the particular collector reagent employed and the grade of the feed. The pulp is conditioned by agitation with the reagent for a suitable length of time. Generally, between about 20 seconds and about five minutes of agitation is sufficient depending upon the thoroughness of the mixing. The conditioned pulp is diluted for froth flotation with an aqueous solution saturated with respect to the soluble constituents of the ore. Generally, sufficient solution is added to obtain a pulp containing between about 20% and about 40% solids density.

Other well known methods of separating the value-bearing constituents may also be used.

As specific examples of the process, the following serve merely as illustrations and it is not intended that the scope of the invention be limited thereto.

*Example I*

Sylvinite ore feed of the analysis shown immediately before Table III and containing particles of all sizes resulting from blasting comminution in the mine was heated in a rotary kiln operating at a rate of 25 pounds per hour throughput. Temperature readings were taken with a mercury blub thermometer located in the stack of the kiln. The material in the kiln was heated at a temperature of between about 350° C. and about 450° C. The fraction between about 2 and about 20 mesh was separated by screening, and the sylvite recovered from this fraction by heavy media classification. Heavy media separations were made at the following specific gravities:

| Specific Gravity | Description |
| --- | --- |
| —2.005 | Sylvite. |
| +2.005–2.035 | High Sylvite Middlings. |
| +2.035–2.0?5 | Low Sylvite Middlings. |
| +2.0?5–2.175 | Halite. |
| +2.175–2.58 | Langbeinite Middlings. |
| +2.58 | Langbeinite. |

The liquids used in varying proportions for this separation were carbon tetrachloride, ethylene dibromide and bromoform. Each fraction of a given specific gravity and size range was analyzed for potassium, for sulfate, and for water insolubles.

Table VI shows the composite percent sylvite potassium in the comminution products of sylvinite ore.

TABLE VI

*Percent sylvite potassium in comminution products*

| Mesh Size | Sylvite Fraction | Sylvite Middlings Fraction | Halite Middlings Fraction | Halite Fraction | Halite Langbeinite Fraction | Langbeinite Fraction | Total |
| --- | --- | --- | --- | --- | --- | --- | --- |
| +2 | | | | | | | 11.49 |
| —2+2½ | 43.42 | 31.78 | 17.17 | 5.04 | 4.02 | 0.96 | 13.31 |
| —2½+3 | 48.39 | 32.38 | 13.76 | 2.92 | 3.94 | 1.15 | 14.42 |
| —3+4 | 50.36 | 29.97 | 11.09 | 1.66 | 2.68 | 0.47 | 12.05 |
| —4+6 | 50.90 | 30.21 | 12.04 | 1.14 | 2.25 | 0.61 | 11.74 |
| —6+8 | 50.72 | 35.82 | 9.32 | 0.75 | 2.46 | 0.51 | 11.63 |
| —8+14 | 51.28 | 40.13 | 9.65 | 0.67 | 2.25 | 0.31 | 11.78 |
| —14+20 | 51.41 | 38.98 | 11.11 | 0.59 | 2.12 | 0.51 | 12.92 |
| —20 | | | | | | | 13.53 |
| | | | | | | | 12.31K=14.8% K₂O |

The particles which were too coarse to pass a commercial screen having 5/16 inch openings (17.77% of the products) were recomminuted, and the particles which went through the screen were separated. The middlings from the heavy media classification of the fraction smaller than about 5/16 inch diameter were combined with the recomminuted product and these combined fractions were separated as above to recover a sylvite concentrate. The analysis of the total sylvite concentrate, which was about 22.19% by weight of the ore, was potassium 50.35%, sulfate 0.24% and insolubles 0.42%. The langbeinite fraction, which was about 5.52% by weight of the ore, had a composition as follows: potassium, 18.71%; sulfate, 67.23%; and insolubles, 0.31%. This is equivalent to 96.8% langbeinite, 0.9% sylvite, 2.0% halite, and 0.3% slimes.

The tailings, which were about 72.29% by weight of the ore, analyzed as follows: potassium, 2.69%; sulfate, 4.19%; and insolubles, 1.76%.

The over-all recovery of sylvite was about 91%; of sulfates (as langbeinite) about 38%. A very small portion of the particles in the sylvite concentrate or in the langbeinite fraction were smaller than about 20 mesh.

*Example II*

About 700 grams of sylvinite ores from the Carlsbad area, containing about 17% K₂O content and varying amounts of clay-like slime forming materials, as shown in Table VII, were heated at temperatures of 525° C., 550° C., and 575° C. Following the heat treatment, the ores were cooled and dry ground to about 100% —20 mesh size and were slurried with sufficient aqueous brine saturated with respect to sylvite and halite to produce pulps of about 60% solids. To the pulps were added varying amounts of an about 2% solution of starch as shown in Table VII, and about 0.2 lbs. per ton of a 5% solution of collector reagent. The reagent consisted of 50% "Armac TD" and 50% "Armac HTD" reagent. "Armac TD" reagent produced by Armour and Company analyzes approximately 30% hexadecylamine acetate, 25% octadecylamine acetate, and 45% octadecenylamine acetate. The "Armac HTD" reagent produced by Armour and Company contains approximately 25% of hexadecylamine acetate, 70% octadecylamine acetate, and 5% octadecenylamine acetate.

After the reagentized pulps were conditioned by agitation for about five minutes, the slurries were placed in Fagergren flotation machines and sufficient aqueous brine saturated with sufficient sylvite and halite was added to the conditioned pulps to produce a solids density of between about 25% and about 30%. Concentrates containing sylvite were collected.

Table VII shows the comparison of the percentage $K_2O$ in the concentrates and the percent $K_2O$ recovered in the flotation concentrates from ores containing varying percentages of insoluble slime forming materials as compared with the same raw materials subjected to reagentizing and flotation, but which have not been heat treated in accordance with the instant process to inactivate the slimes.

It is noted that ores containing about 2.6% slime forming material yield, upon heating followed by flotation, concentrates of a higher $K_2O$ content, and the $K_2O$ recovery is higher than when the ore has not been heat treated. This is true even though less starch slime inhibitor was used on the heat treated ore. Ores containing 3.5% and 4.5% insoluble slime forming materials were subjected to froth flotation. When the ores had not been heat treated, no concentrate could be obtained from the flotation because the slimes adsorbed all of the flotation reagents. On the other hand, when the same ores were heat treated to inactivate the slimes, concentrates containing about 54% $K_2O$ were obtained even though less starch inhibitor was employed, and the recoveries were about 96.7%.

TABLE VII

*Percent $K_2O$ recovered from sylvinite ores*

| Slime Forming Material | 2.68% | | 3.50% | | 4.50% | |
| --- | --- | --- | --- | --- | --- | --- |
| Temperature | No Baking | 525° C. | No Baking | 550° C. | No Baking | 575° C. |
| Starch (lbs./ton) | 2.0 | 1.25 | 1.0 | 0.5 | 1.0 | 1.0 |
| $K_2O$ in Concentrate......percent.. | 49.9 | 57.8 | No Float | 54.0 | No Float | 54.2 |
| $K_2O$ Recovered......do.... | 49.6 | 97.9 | No Float | 96.7 | No Float | 96.6 |
| $K_2O$ in Tailings......do.... | 10.3 | 0.5 | | 0.8 | | 0.8 |

Having thus fully described and illustrated the character of the invention, what is desired to be secured and claimed by Letters Patent is:

1. A process which comprises heating sylvinite ore containing slime-producing materials between about 180° C. and about 500° C. until the slime-producing materials are altered to hard, brittle, nondispersible materials and recovering the potash values from the heat-treated ore.

2. A process which comprises heating sylvinite ore containing slime-producing materials at a temperature above about 180° C. but below its fusion temperature until the slime-producing materials are substantially completely altered to hard, brittle, nondispersible materials and recovering at least a portion of the potash values from the heat-treated ore.

3. A process which comprises heating sylvinite ore containing slime-producing materials at a temperature above about 180° C. but below its fusion temperature until the slime-producing materials are substantially completely inactivated, comminuting the resultant heat-treated ore to about 100% minus 20 mesh size, conditioning the comminuted ore with a sylvinite collector flotation reagent, subjecting the conditioned ore to froth flotation and recovering a sylvite concentrate.

4. A process which comprises heating a langbeinite-sylvinite mixed ore containing slime-producing materials at a temperature above about 180° C. but below its fusion temperature until the slime-producing materials are substantially completely altered to hard, brittle, nondispersible materials and recovering at least a portion of the potash values from the resultant heat-treated ore.

5. A process which comprises heating a langbeinite-sylvinite mixed ore containing slime-producing materials at a temperature above about 180° C. but below its fusion temperature until the slime-producing materials are substantially completely inactivated, comminuting the resultant heat-treated ore to about 100% minus 20 mesh size, conditioning the comminuted ore with a sylvite collector flotation reagent, subjecting the conditioned ore to froth flotation and recovering a sylvite concentrate.

6. A process which comprises heating sylvinite ore containing clay-like slimes at a temperature between about 180° C. and 500° C. until the clay-like slimes are substantially completely altered to hard, brittle, nondispersible materials and recovering the potash values from the heat-treated sylvinite ore.

7. A process which comprises heating sylvinite ore containing clay-like slimes between about 180° and about 500° C. until the clay-like slimes are substantially completely inactivated, while simultaneously comminuting the resultant heat-treated sylvinite ore to a particle size of at least about a plus 4 mesh, further comminuting the heat-treated ore, conditioning the comminuted ore with a sylvite collector flotation reagent, subjecting the conditioned ore to froth flotation and recovering a sylvite concentrate.

8. A process which comprises heating a langbeinite-sylvinite mixed ore containing clay-like slimes at temperatures between about 180° C. and about 500° C. until the clay-like slimes are substantially completely altered to hard, brittle, nondispersible materials, while simultaneously comminuting the mixed ore to a size of at least plus 4 mesh, further comminuting the heat-treated ore, subjecting the heat-treated mixed ore to heavy media classification and recovering a beneficiated potash fraction therefrom.

9. A process which comprises heating sylvinite ore containing clay-like slimes at a temperature between about 180° C. but below its fusion temperature until the clay-like slimes are substantially completely inactivated, comminuting the resultant heat-treated ore to about a 100% minus 20 mesh size, preparing a pulp of the comminuted ore in an aqueous solution saturated with respect to the solid constituents of said ore, conditioning the pulp for froth flotation with a reagent selected from the group consisting of long-chain aliphatic amines and their water-soluble addition salts and in the presence of starch as a slime inhibitor subjecting the conditioned pulp to froth flotation to produce a sylvite-containing concentrate and recovering the said sylvite-containing concentrate.

10. A process which comprises heating langbeinite-sylvinite mixed ore which contains clay-like slimes at a temperature between about 180° C. and below its fusion temperature until constituent minerals are liberated and slime-producing material is inactivated, further comminuting the heat treated ore to about 100% minus 30 mesh size, preparing a pulp of the comminuted ore in an aqueous brine saturated with respect to the soluble constituents of the ore, conditioning the pulp for froth flotation with a reagent comprising an alkali sulfonate of a long chain aliphatic fatty acid derivative and in the presence of a starch slime inhibitor, subjecting the conditioned pulp to froth flotation to produce a langbeinite-containing concentrate, collecting the langebeinite concentrate and the sylvite-containing fraction, conditioning the sylvite-containing fraction for froth flotation with a reagent selected from the group consisting of long chain aliphatic amines and their water soluble acid addition salts and in the presence of starch slime inhibitor, subjecting the conditioned pulp to froth flotation to produce a sylvite-containing concentrate, and collecting the sylvite-containing concentrate.

11. A process which comprises heating ore comprising sylvinite which contains slime-producing clays at a temperature above about 180° C., but below the fusion temperature, until the slime-producing materials are altered to hard, brittle, nondispersible materials, and recovering potassium-containing compounds from the resulting heat-treated ore.

12. The process of claim 11 in which the ore is heated at a temperature between about 180° C. and about 550° C.

13. The process of claim 12 in which the ore is heated at a temperature between about 400° C. and about 550° C. for between about 10 minutes and about 20 minutes.

References Cited in the file of this patent

UNITED STATES PATENTS

| | | |
|---|---|---|
| 734,240 | Propfe | July 21, 1903 |
| 1,422,026 | Brown | July 4, 1922 |
| 1,679,857 | France | Aug. 7, 1928 |
| 2,197,865 | Johnson | Apr. 23, 1940 |
| 2,387,561 | Brenner | Oct. 23, 1945 |
| 2,593,431 | Fraas | Apr. 22, 1952 |

FOREIGN PATENTS

| | | |
|---|---|---|
| 48,166 | Norway | July 21, 1930 |

OTHER REFERENCES

Transactions of the Faraday Society of London, vol. 18, October 1922, pages 82–86. (Copy in Scientific Library.)

U. S. Bureau of Mines Report of Investigations No. 3271, February 1935, pages 2 and 3 and No. 3336, February 1937, 13 pages.

Richards: "Ore Dressing," vol. 2, 1st edition, (c) 1903, page 829. (Copies available in Scientific Library.)

Industrial and Engineering Chemistry, vol. 32, No. 5, May 1940, pages 600–604. (Copy in Scientific Library.)